United States Patent [19]

Michaud

[11] Patent Number: 5,532,674
[45] Date of Patent: Jul. 2, 1996

[54] IDLE BRAKE LIGHT SYSTEM

[76] Inventor: Paul J. Michaud, 852 N. Roy St., Melrose Park, Ill. 60164

[21] Appl. No.: 69,345
[22] Filed: May 28, 1993
[51] Int. Cl.$^6$ .................................................. B60Q 1/26
[52] U.S. Cl. .................... 340/479; 340/463; 340/464; 340/467; 340/468
[58] Field of Search .................................. 340/463, 464, 340/467, 468, 479, 432

[56] References Cited

U.S. PATENT DOCUMENTS

| | | | |
|---|---|---|---|
| 3,522,582 | 8/1970 | Tuttle | 340/467 |
| 4,550,305 | 10/1985 | Bookbinder | 340/479 |
| 4,959,634 | 9/1990 | Miller | 340/467 |
| 5,008,647 | 4/1991 | Brunt et al. | 340/432 |
| 5,023,599 | 6/1991 | Mitchell et al. | 340/467 |
| 5,111,181 | 5/1992 | Priesemuth | 340/479 |
| 5,121,100 | 6/1992 | Gallo | 340/479 |

Primary Examiner—John K. Peng
Assistant Examiner—Edward Lefkowitz
Attorney, Agent, or Firm—Wallenstein & Wagner, Ltd.

[57] ABSTRACT

A new system to illuminate and maintain illuminated a brake light on a motorcycle anytime the throttle handle is in the idle position, or, primarily when the motorcycle is substantially stopped. In one system, an electrical switch linked with the brake light electrical circuit and mounted in the throttle handle assembly, is so positioned and aligned with a plunger molded on the throttle handle, to provide that anytime the throttle handle is in it's normal or released idle position, the plunger will actuate the switch to complete the circuit and illuminate the brake light. In another system, a control senses motorcycle movement, and illuminates the brake light when the motorcycle is sufficiently stopped, as at a traffic signal. Yet another system combines the two systems, automatically illuminating the brake light when the motorcycle has been stopped and the throttle handle is in the idle position.

5 Claims, 5 Drawing Sheets

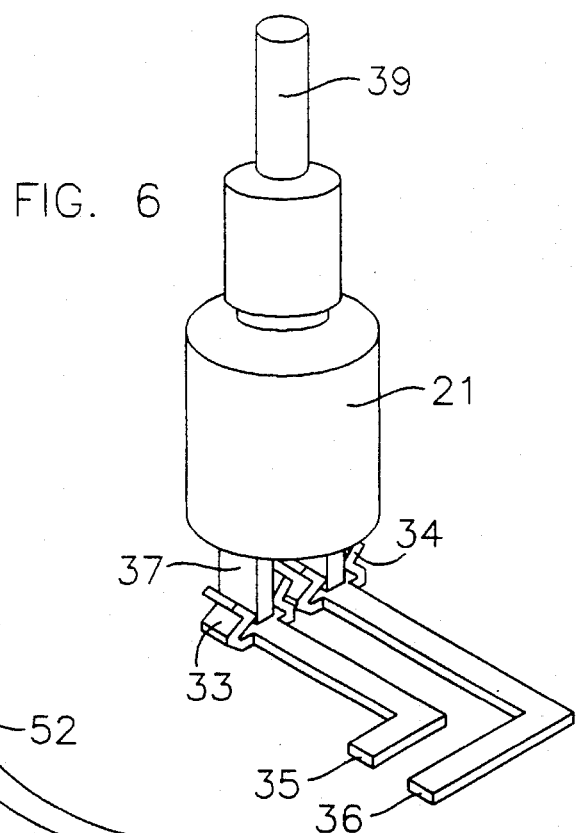
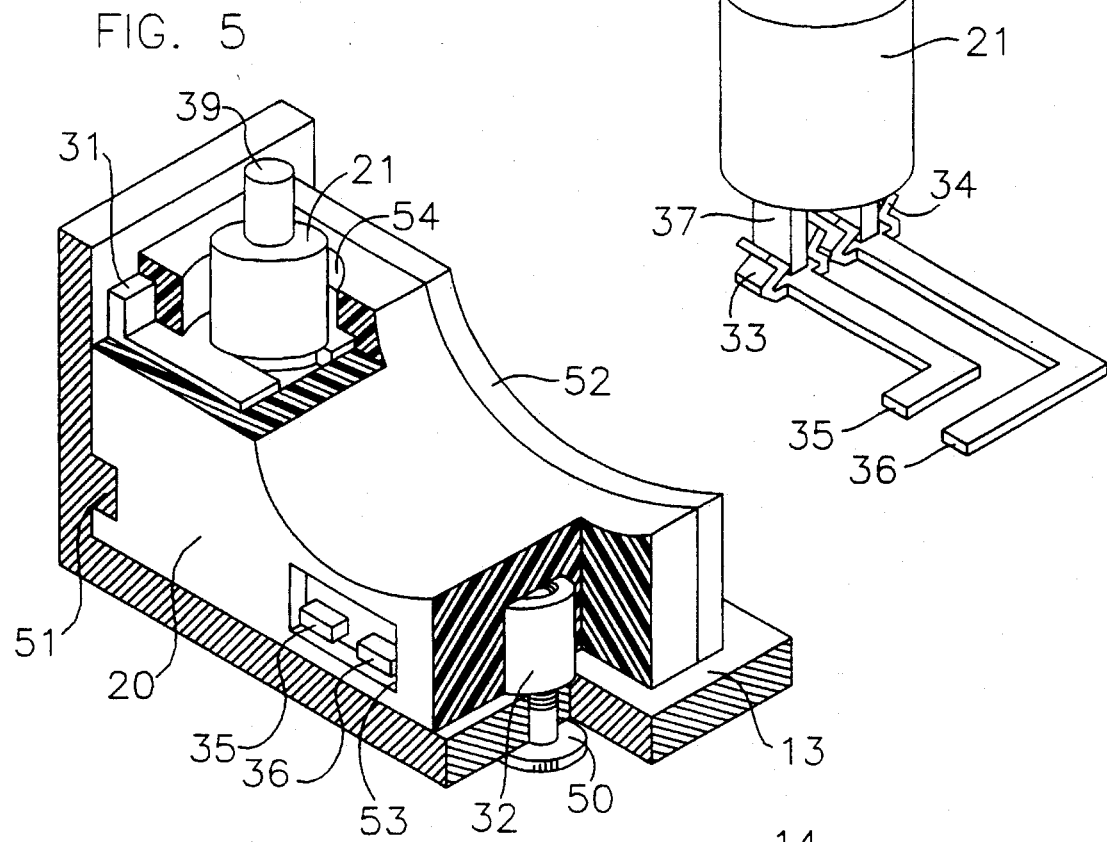
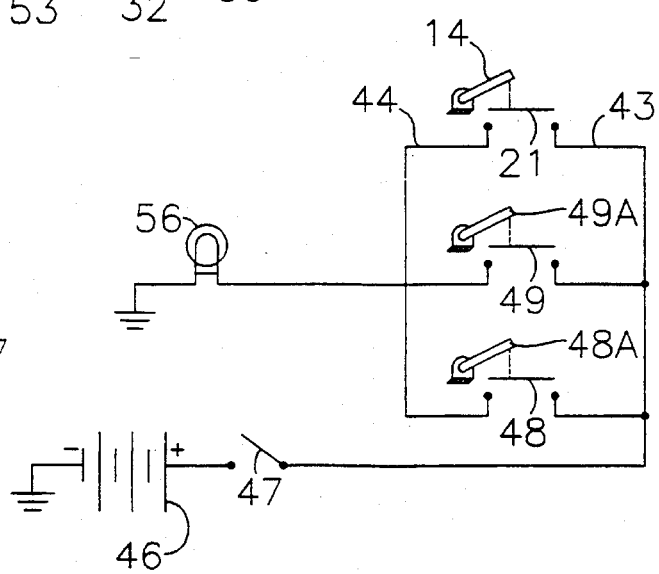

IDLE BRAKE LIGHT SYSTEM

FIELD OF INVENTION

This invention relates to motorcycles, and more particularly, to a new system to illuminate and maintain illuminated a motorcycle brake light.

DESCRIPTION OF PRIOR ART

Hardly anything can be more hazardous to a motorcycle rider than not having an illuminated brake light while waiting at a traffic light or any other prolonged traffic stop where he or she is vulnerable from the rear. Yet this condition is a common occurrence on roads everywhere, and stems not from mechanical error but rather from the riding habits of the rider.

All motorcycles currently in production are equipped with front and rear brakes, each activated by it's own individual means. The front brake is activated by a hand operated brake lever and the rear brake is activated by a foot operated brake pedal, and the hand lever and foot pedal each actuates it's own switch linked with the brake light electrical system. When the operator applies pressure to either the lever or pedal, the respective switch will close to illuminate the brake light. However, only when pressure is maintained on either switch, via the brake lever or brake pedal, will the brake light remain illuminated.

Unlike the operator of an automobile who can control the vehicle sitting comfortably in a relatively safe surrounding, a motorcycle rider, vulnerable from all sides at all times, must make use of all faculties to control and operate the vehicle safely. To accelerate or decelerate the rider simultaneously has to operate the clutch with the left hand, transmission with the left foot, and throttle with the right hand. To bring the motorcycle to a stop, the rider must not only be performing the above actions, but also applying the rear brake with the right foot and front brake with the right hand. Whether balancing at a standstill or accelerating at high speeds the operation of a motorcycle is a defensive effort, at times physically draining the rider and producing road fatigue. When a rider is on a motorcycle but not moving, such as waiting at a traffic light, he or she must balance the motorcycle with one or both feet on the ground, making it difficult and uncommon to keep a foot applied to the brake pedal. Keeping a firm pull on the brake lever, while the cycle is stopped, is not a common practice either. Instead, due to the road fatigue involved with riding a motorcycle, particularly with a "cafe racer" style motorcycle where the rider is bent over while riding, most riders consider the momentary stop at a traffic light or any other traffic stop as an opportunity to shift the motorcycle into neutral and relax, with both feet on the ground, or leave the motorcycle in gear and idling at a standstill while holding only the clutch handle in. As such, since pressure is not being applied to either the brake pedal or brake lever, the brake light is not illuminated. What results is an unsafe situation where an already vulnerable motorcycle rider stopped at a traffic light has no illuminated brake light to alert other motorists approaching from the rear.

SUMMARY OF THE INVENTION

This invention provides alternate systems to illuminate the brake light and to maintain it illuminated without the need of the rider applying pressure to the brake lever or brake pedal.

The invention works on the principle that anytime the throttle handle is in the idle position, the cycle is either not moving or the operator is dramatically slowing down with the intention of stopping soon thereafter. The throttle handle is consistently returned to the idle position, the furthest possible position the throttle handle can be rotated in one direction, due to a spring loaded throttle cable linkage between the throttle handle and the carburetor.

One embodiment of the invention, inexpensively and with minimum alteration to existing components, incorporates a system in the throttle handle assembly that will illuminate the brake light anytime the throttle handle is in the idle position. The system consists of a plunger molded to the throttle handle, to rotate with the handle and act against a switch seated in a lower throttle handle clamp of the throttle assembly, the switch being connected to the existing brake light electrical circuit. The plunger and switch, are so positioned and aligned that anytime the throttle handle is in it's idle position, the plunger will actuate the switch to complete the electrical circuit to illuminate the brake light.

A second embodiment of the invention provides a motion detector to sense when the motorcycle is not moving, and when sufficient lack of motorcycle movement is detected, provides a switch that is closed to complete the electrical circuit and illuminate the brake light.

A third embodiment of the invention provides a combination of both previous systems, whereby when both the throttle handle is in the idle position and the motorcycle is sufficiently stopped, the brake light will be illuminated, independently of the normally required hand lever or foot pedal actuation.

Accordingly, a primary object of this invention is to provide constant illumination of the brake light when a motorcycle is stopped and/or idling, replacing the dependence and need of the rider constantly applying either the front wheel brake lever or rear wheel brake pedal to maintain an illuminated brake light.

Another object of this invention is to provide improved visibility of a motorcycle rider, while stopped and idling or decelerating without actually braking, for enhancing rider safety.

Other objects and advantages of this invention will become apparent to persons familiar with this type of equipment upon referring to the following specifications, the accompanying drawings being a part thereof.

BRIEF DESCRIPTION OF DRAWINGS

For illustration of my invention, reference is made to the accompanying drawings in which:

FIG. 5 is a broken away perspective similar to FIG. 4, except illustrating structure for mounting the idle brake light switch operatively in place.

FIG. 6 is perspective view illustrating the idle brake light switch and it's operating components.

FIG. 7 is an electrical diagram showing the invention integrated into a typical motorcycle brake light system.

DETAILED DESCRIPTION OF PREFERRED EMBODIMENTS

Figure 1:
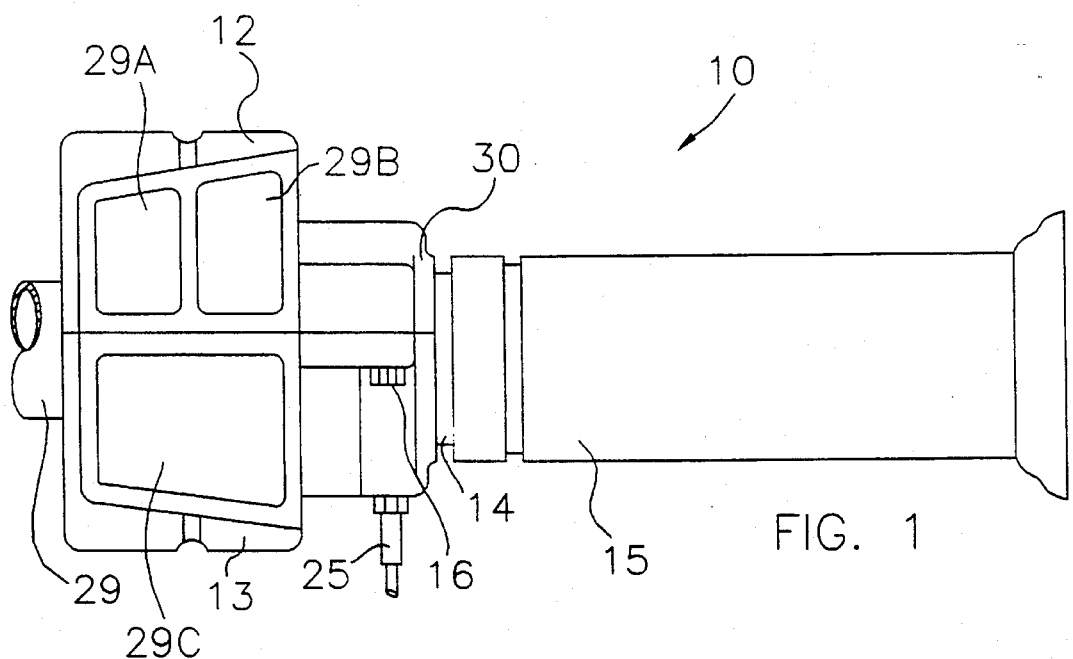
FIG. 1 is a side elevational view of one typical form of a motorcycle throttle handle assembly.
Figure 2:
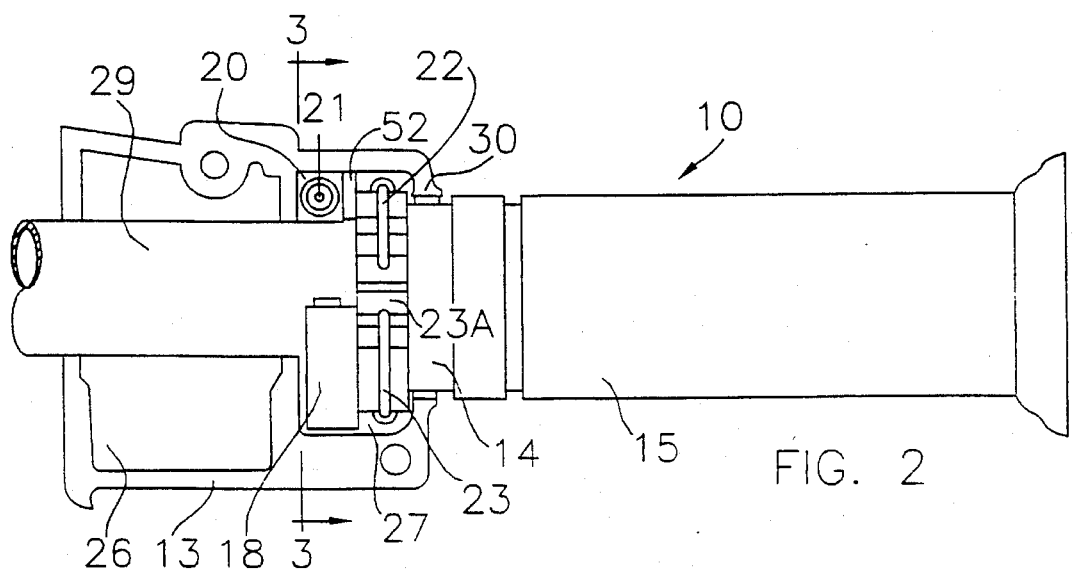
FIG. 2 is a top plan view of the throttle handle assembly shown in FIG. 1, with an upper throttle handle clamp removed for exposing the invention and throttle handle in a throttle open position.
Figure 3:
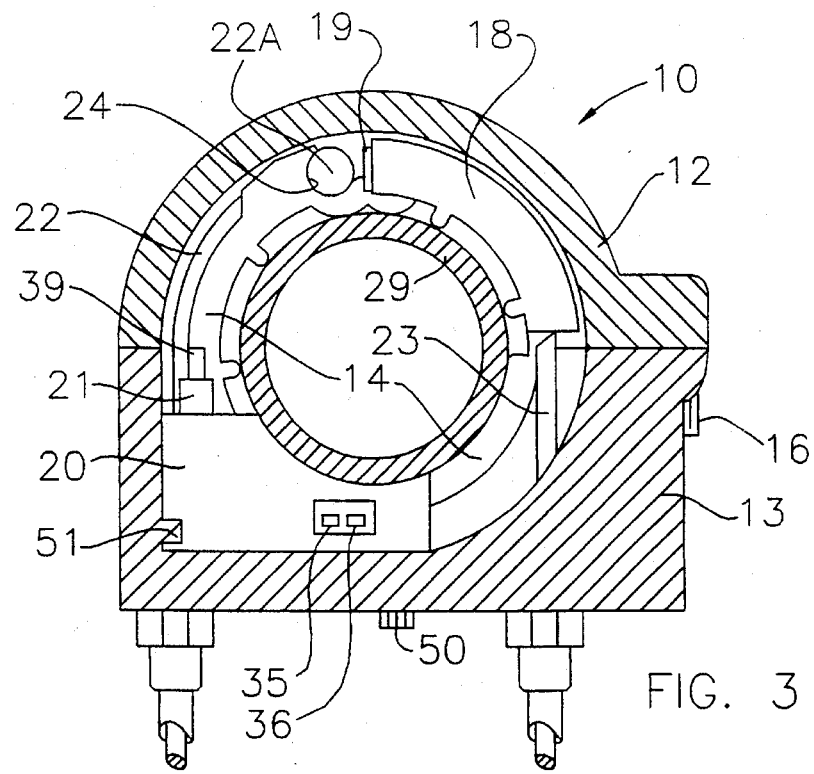
FIG. 3 is a sectional view of the throttle handle and this invention as taken generally along line 3—3 in FIG. 2.

For convenience and without imposing any limitations on the construction of the invention to be disclosed, FIGS. 1,2, and 3 show a throttle handle assembly 10 in a throttle open or accelerating position. The assembly 10 is comprised of a generally cylindrical throttle handle 14 secured to a handlebar 29 in the usual manner using an upper throttle handle clamp 12 and lower throttle handle clamp 13 fastened together with screws 16. The handle 14 would be made of hard plastic, or it's equivalent, and provided with a typical grip 15.

Figure 4:
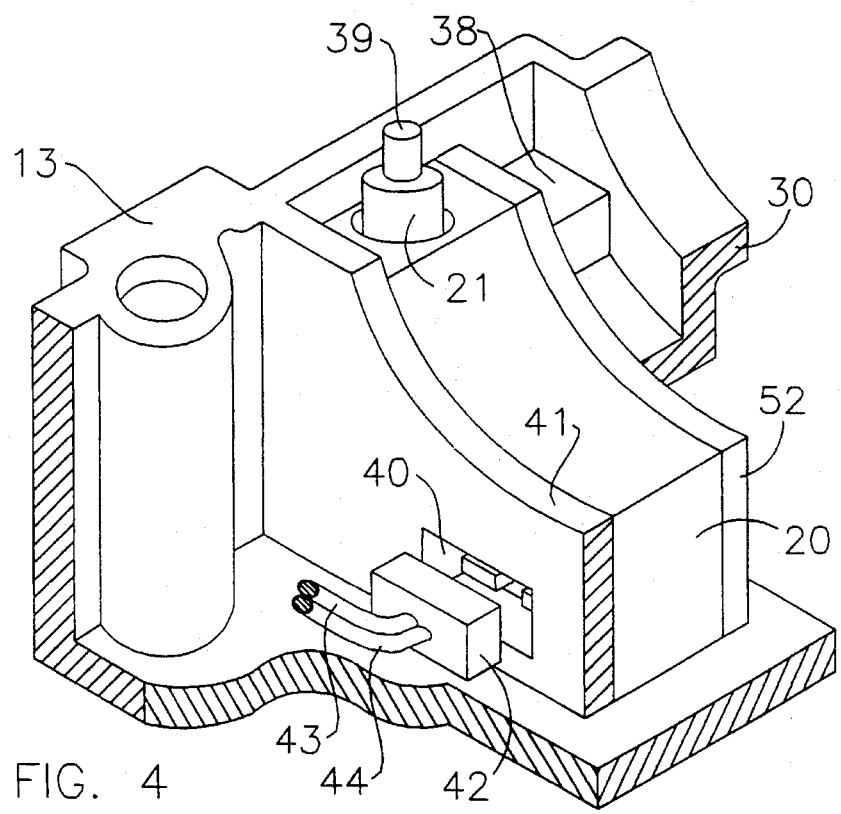
FIG. 4 is a broken away perspective view of a lower handle clamp with the idle brake light switch operatively mounted therein.

The aforesaid handle in this invention is modified to have a crescent shaped plunger 18 molded on it's opened end, and a round shaped resilient stop pad 19 is on one end of the crescent shaped plunger 18. The throttle cavity 27 defined within the assembled upper and lower throttle handle clamps 12 and 13 is widened to accommodate the plunger 18, a switch block 20 (see FIGS. 4,5, and 6) having a side curved to fit under the handlebar, and an operating idle brake light switch 21 held in the switch block.

The switch block 20, also molded of hard plastic or it's equivalent, holds two electrically conductive metal pieces shaped to define end prong clips 33 and 34 and end terminal prongs 35 and 36. The end terminal prongs 35 and 36 are exposed within a switch block recess 53 that operatively is aligned with opening 40 in the inner control wall 41.

The idle brake light switch 21 is a momentary type contact switch having an actuating button 39 for shifting make-break contacts, a return spring (not shown), and exposed switch prongs 37. The switch 21 is fitted through a hole 54 in the top of the switch block 20 and secured to the switch block 20 by a retaining clip 31 inserted through a slot in the backside of the switch block.

The switch block 20 is seated between the lower clamp walls 41 and 52 and is secured in place within the throttle cavity 27 by two different means. Thus, a ledge 51 cast in the lower clamp 13 and extended horizontally between the clamp walls 41 and 52 fits in a corresponding recess located in the backside of the switch block 20, and a screw 50 fits through the underside of the lower clamp 13 and is threaded into metal insert 32 molded within the switch block 20.

The switch prongs 37 are operatively connected to the exposed prong clips 33 and 34 in the switch block 20, and the terminal prongs 35 and 36 are exposed through the access opening 40 in the inner control wall 41 to allow a terminal plug 42 to be operatively connected to the prongs, to integrate the switch 21 into the electrical circuit for the brake light.

Figure 11:
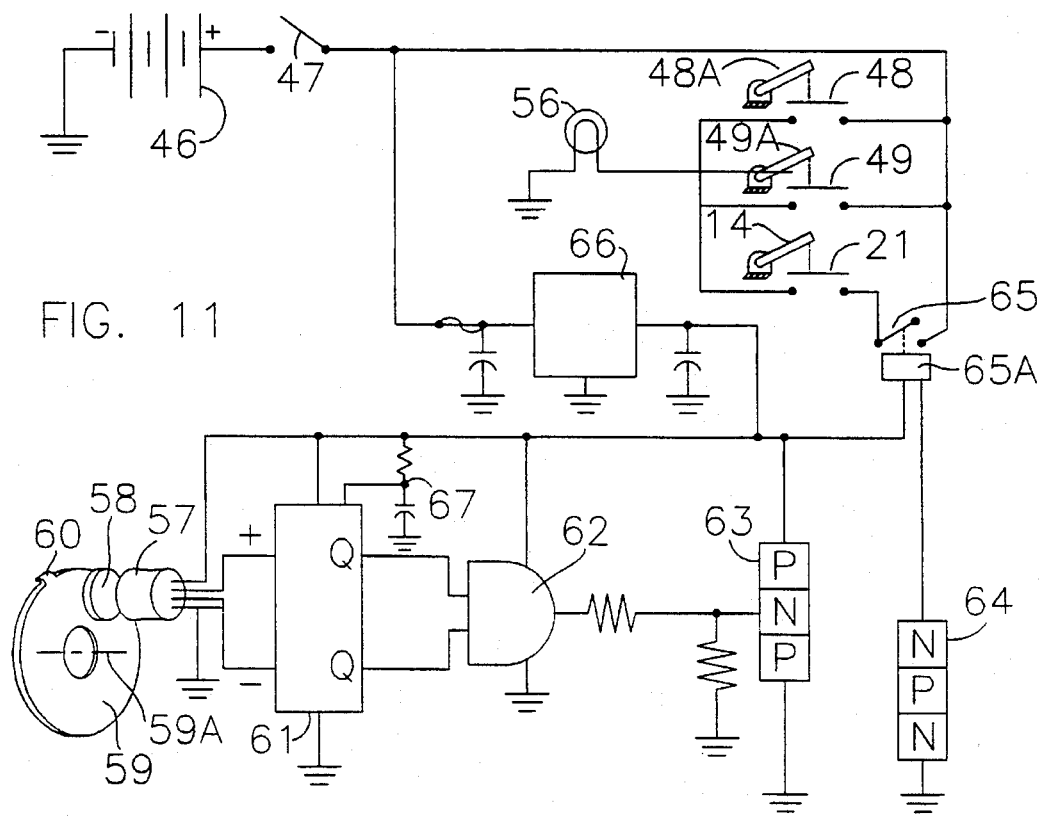
FIG. 11 is an electrical diagram similar to FIG. 7, except showing a motion detector system for the motorcycle and an alternate embodiment of the invention for illuminating the brake light.

The terminal plug wiring 43 and 44 can be part of the wiring harness 45 (seen in FIG. 8) which is usually routed to the control cavity 26 through the handle bar 29 for supplying controls for the on/off (kill) switch (not shown), start switch (not shown), turn signal (not shown), and front brake light switch 49 for example, shifted manually via conventional actuators, such as illustrated at buttons 29a, 29b, and 29c in FIG. 1 and the front brake grip lever (49a in FIGS. 7 and 11 ).

FIG. 7 illustrates the schematic wiring 43 and 44, connected via the terminal plug 42 and terminal prongs 35 and 36 to switch 21, to integrate the idle brake light system into an existing brake light electrical circuit. With power supplied by the battery 46 and the ignition switch 47 closed, when any of the rear brake light switch 48 operated by actuation of the brake pedal 48a, front brake light switch 49 operated by actuation of front brake lever 49a, or the idle brake light switch 21 is closed, a power circuit is completed to illuminate the brake light 56. As previously noted, the idle brake light switch 21 will be closed when any type of pressure is applied to the actuating button 39.

Figure 8:
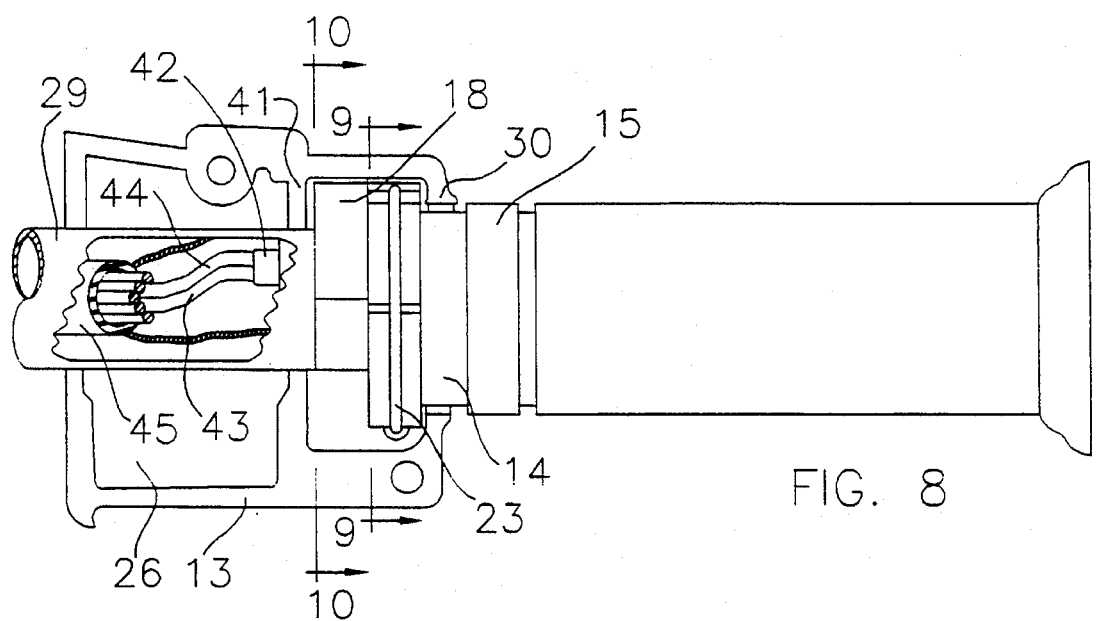
FIG. 8 is a top plan view of the throttle handle assembly, similar to FIG. 2 except for illustrating the throttle handle in the idle position and a portion of the handlebar cutaway for revealing the routing of the wiring harness.
Figure 9:
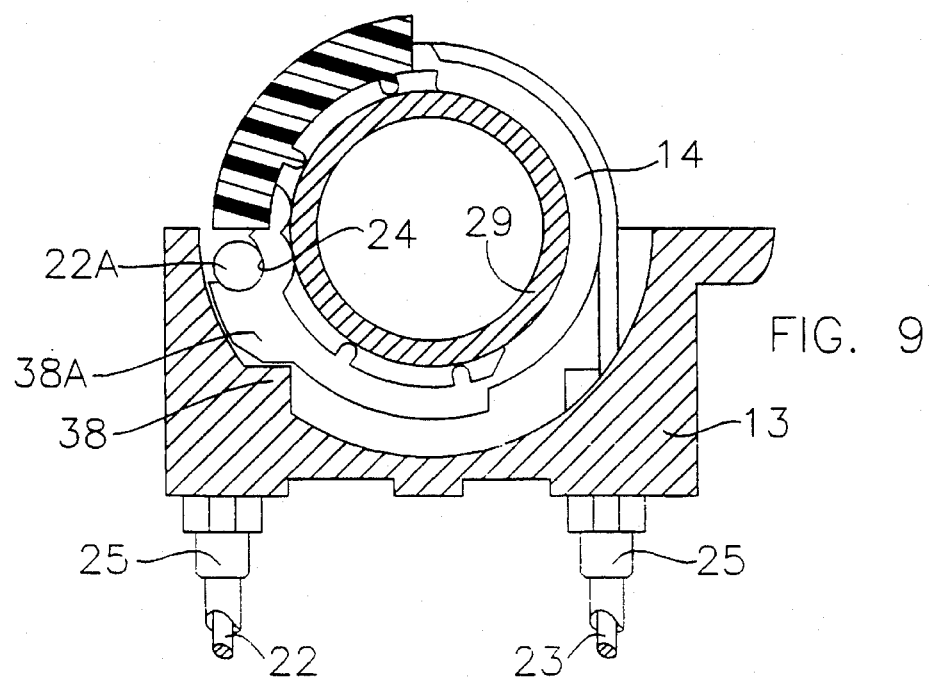
FIGS. 9 and 10 are sectional views of the throttle handle in the idle position taken respectively along lines 9—9 and 10—10 in FIG. 8.
Figure 10:
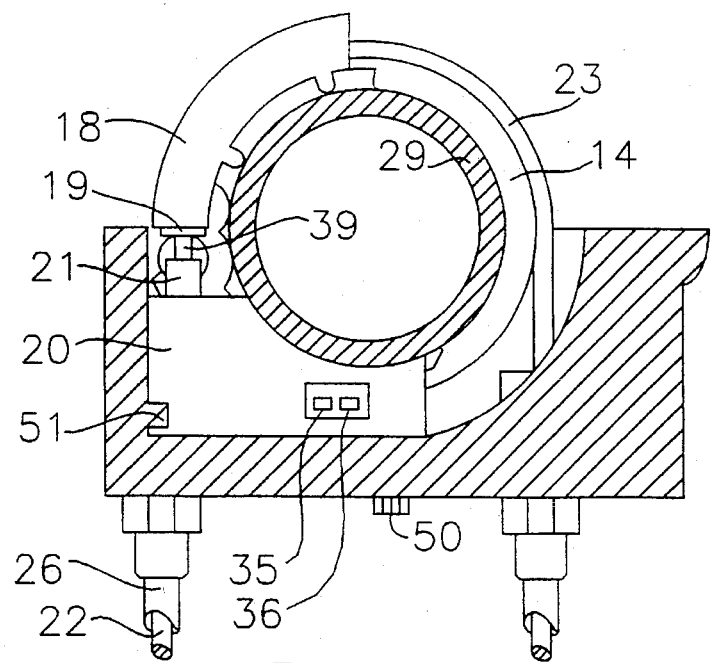

Both the upper and lower throttle handle clamps 12 and 13 are made of cast metal and, as shown in FIG. 8, together define outer flange 30 that encircles the throttle handle 14 between cable notches 24 and throttle grip 15, allowing the handle to rotate freely clockwise or counterclockwise. Referring to FIGS. 9 and 10, a stop 38a on the handle hits the idle stop 38 in the lower throttle handle clamp 13 to determine the furthest allowable distance the throttle handle 14 can be rotated in a counterclockwise direction, and this represents the throttle handle 14 idle position. Anytime the rider releases the throttle handle 14, it returns to the idle position via the tension in the throttle cable 22. The throttle cable 22 and idle cable 23 are attached to the handle in the usual manner by means of their end balls fitted into the ferrules 22a and 23a seated in their respective cable notches 24. Each cable is routed to the carburetor through it's cable sleeves 25 and through a hole provided on the underside of the lower throttle handle clamp 13. The throttle handle 14 is maintained in the idle position (FIGS. 8 and 9) because of the constant tension created via the throttle cable 22 being connected to spring loaded linkage at the carburetor. All throttle handles are equipped with a throttle cable 22 and work as described, although the idle cable 23 is optional and need not be part of the throttle handle operation. Nonetheless, throttle handles of all known motorcycles when not manually shifted otherwise are visibly biased to return to the idle position.

The stop pad 19 and the actuating button 39 of the idle stop switch 21 are so aligned and positioned that anytime the throttle handle 14 is in the idle position (see FIG. 10), the plunger stop pad will apply the necessary pressure to the button 39 to close the switch 21 and complete the electrical circuit to illuminate the brake light. As long as the throttle handle remains in the idle position, the actuation pressure will keep the switch closed and the brake light will remain illuminated.

One can now understand that I have provided a system to maintain a brake light illuminated independently of the usual depressing or gripping pressure applied on the rear wheel brake pedal 48a or front wheel brake lever 49a which in turn will contribute to the safety of the rider for accomplishing a major object of the invention.

An alternative system to illuminate and maintain illuminated a motorcycle brake light is by means of a motion sensing device and control shown in FIG. 11. A magnetic switch is sealed in a dust proof case and mounted on the axle of either the front or rear motorcycle wheel. The pick-up side component 57 of the switch is secured to one side of the case and it's cooperating magnet component 58 is mounted on a disk 59 freewheeling about the wheel axle (indicated only by it's center axis 59a). A nub 60 located on the disk 59 is keyed to the wheels hub, and similar to a speedometer drive, rotates with the wheel. As the disk 59 rotates with the wheel, the magnetic switch components 58 and 57 will transmit repeated signals as a "pulse train" signifying movement of the motorcycle.

Related circuitry activated by the pulse train signals includes a dual-edged triggered, retriggerable monostable multivibrator 61, an "and" gate 62 across the multivibrator outputs, a driver 63, a power transistor 64, and a relay 65a having a normally open switch 65 driven by the power transistor. A 5 volt regulator 66 is connected to the 12 volt vehicles electrical system including the battery 46, and R/C network 67 is provided with values to establish approximately a 2 second time constant. Thus, at least one pulse train signal every two seconds would be needed in order to maintain the multivibrator 61 actuated, corresponding to what might be considered running or operating motion of the motorcycle.

However, when the motorcycle is substantially stopped to where the wheel movement is less than needed according to the time constant frequency, the "pulse train" signals emitted by the magnetic switch components 57 and 58 are no longer present at the input of the multivibrator 61 disabling the "and" gate 62, the driver 63, and power transistor 64, thereby providing ground to and closing the contacts 65 of the relay switch 65a, and illuminating the brake light 56. When the motorcycle movement and the corresponding rotation of the disk 60 create sufficient "pulse train" signal frequency via the magnetic switch components 57 and 58, at the input of the multivibrator 61, to enable the "and" gate 62, the driver 63, and the power transistor 64, and thereby remove ground to and open the relay switch 65, the brake light circuit is de-energized and the brake light extinguished. The time constant frequency can be selected as desired by varying the value of the R/C network 67.

Yet another system for illuminating the brake light 56 utilizes both the idle brake light switch 21 and the motion sensing system and control described above, where the idle brake light switch 21 is placed electrically in series with the relay switch 65. Thus should the throttle handle be released while operating the motorcycle, the brake light 56 will not be illuminated unless or until the motorcycle wheel has been slowed enough to interrupt the needed pulse train signals and close the relay switch 65.

Although all electrical diagrams discussed in the above specification are positive switch systems, with minimum modification the results of all the embodiments can still be achieved in a negative switch system.

Also, since each manufacturer produces their own design of throttle handle clamps, this invention should not be limited to the illustrated disclosure. However, a marginal space will generally be needed in any type of throttle handle clamp to accommodate the idle brake light switch. For these reasons, and since other minor variations of the invention as disclosed might become apparent to those skilled in the art, the invention is to be limited only by the terms of the appended claims.

What is claimed as my invention is:

1. In a motorcycle having a wheel brake and a brake light illuminated responsive to the wheel brake being applied, and a throttle handle oriented in an idle position for powering the motorcycle when stopping or stopped and oriented in other positions for powering the motorcycle for moving, an improved brake light control comprising the combination of switch means connected in a power circuit with the brake light, operable to illuminate the brake light when shifted, and means to shift the switch means responsive to the motorcycle stopping or being stopped to provide for illumination of the brake light even should the wheel brake not be applied;

said means to shift the switch means comprising linkage operated by the throttle handle only when oriented in the idle position, providing that the brake light is illuminated when the throttle handle is oriented in the idle position, said motorcycle having a handelbar which supports said throttle handle to rotate about its axis and also holds said switch means adjacent said throttle handle, and said linkage comprising a stop formed on the throttle handle suited to shift said switch means only when the throttle handle is oriented in the idle position.

2. In a motorcycle having a wheel brake and a brake light illuminated responsive to the wheel brake being applied, and a throttle handle oriented in an idle position for powering the motorcycle when stopping or stopped and oriented in other positions for powering the motorcycle for moving, an improved brake light control comprising the combination of switch means connected in a power circuit with the brake light, operable to illuminate the brake light when shifted, and means to shift the switch means responsive to the motorcycle stopping or being stopped to provide for illumination of the brake light even should the wheel brake not be applied;

said switch means having first and second separate switch means connected in series in the power circuit, and said means to shift the switch means comprising detection means operable to detect a lack of movement of the motorcycle sufficient to correspond to it being substantially stopped, and means to shift the first switch means responsive to the detection means detecting the motorcycle is substantially stopped, and wherein said means to shift the switch means further comprising linkage operated by the throttle handle only when oriented in the idle position for shifting the second switch means, for providing that the brake light is illuminated when the motorcycle is both substantially stopped and the throttle handle is oriented in the idle position.

3. A motorcycle brake light control according to claim 2, further wherein said detection means comprising means operable to generate a pulse train signal upon motorcycle movement, and means to respond to the pulse train signal being below a specific minimum time constant frequency corresponding to the motorcycle being substantially stopped, operable to shift the first switch means.

4. A motorcycle brake light control according to claim 2, further wherein a handlebar supports said throttle handle to rotate about its axis and also holds said second switch means adjacent said throttle handle, and said linkage comprising a stop formed on the throttle handle suited to shift said second switch means only when the throttle handle is oriented in the idle position.

5. A motorcycle brake light control according to claim 2, further wherein said detection means comprising means operable to generate a pulse train signal upon motorcycle movement, and means to respond to the pulse train signal being below a specific minimum time constant frequency corresponding to the motorcycle being substantially stopped operable to shift the first switch means, structure supporting said throttle handle to rotate about its axis and also holding said second switch means adjacent said throttle handle, and said linkage comprising a stop formed on the throttle handle suited to shift said second switch means only when the throttle handle is oriented in the idle position.

* * * * *